(12) United States Patent
Kim

(10) Patent No.: US 6,686,837 B2
(45) Date of Patent: Feb. 3, 2004

(54) BRAKE LIGHT CONTROL SYSTEM FOR A MOTORCYCLE

(76) Inventor: Jounghoon Kim, 2FL., Dongil B/D #40, Kuro-5-Dong, Kurogu, Seoul (KR)

( * ) Notice: Subject to any disclaimer, the term of this patent is extended or adjusted under 35 U.S.C. 154(b) by 12 days.

(21) Appl. No.: 10/170,259

(22) Filed: Jun. 13, 2002

(65) Prior Publication Data

US 2003/0231109 A1 Dec. 18, 2003

(51) Int. Cl.$^7$ ................................................ B60Q 1/44
(52) U.S. Cl. ...................................... 340/479; 340/432
(58) Field of Search .......................... 340/425.5, 432, 340/463, 467, 475, 479, 480; 362/72, 105, 106, 473

(56) References Cited

U.S. PATENT DOCUMENTS

| | | | | |
|---|---|---|---|---|
| 4,286,262 A | * | 8/1981 | Wahl | 340/5.64 |
| 4,760,373 A | | 7/1988 | Reilly | 340/432 |
| 4,851,813 A | * | 7/1989 | Gottlieb | 340/463 |
| 4,891,736 A | | 1/1990 | Gouda | 361/105 |
| 4,903,007 A | * | 2/1990 | Gottlieb | 340/463 |
| 5,040,099 A | | 8/1991 | Harris | 362/72 |
| 5,353,008 A | | 10/1994 | Eikenberry et al. | 340/479 |
| 5,477,209 A | * | 12/1995 | Benson, Jr. et al. | 340/479 |
| 6,097,287 A | | 8/2000 | Lu | 340/479 |
| 6,406,168 B1 | * | 6/2002 | Whiting | 362/473 |
| 6,529,126 B1 | * | 3/2003 | Henry | 340/467 |

* cited by examiner

*Primary Examiner*—Van Trieu
(74) *Attorney, Agent, or Firm*—Park & Sutton LLP; John K. Park

(57) ABSTRACT

A brake light control system for a motorcycle, comprises a module attached to a helmet. The module has a signal receiver, a light emitter, and a battery to power the receiver and emitter. A brake light assembly in the motorcycle includes a brake socket connected to a power source in the motorcycle. A transmitter having a socket and a plug is removably installed between the bulb plug and the brake socket in a way in which the bulb plug is mounted in the transmitter socket, and the transmitter plug is mounted in the brake socket. The transmitter radiates an infrared brake signal to the signal receiver while electrically activating the bulb by the braking operation of the motorcycle.

18 Claims, 2 Drawing Sheets

BRAKE LIGHT CONTROL SYSTEM FOR A MOTORCYCLE

BACKGROUND OF THE INVENTION

The invention relates to a motorcycle braking mechanism. More particularly, the present invention relates to an improved brake light control system for a motorcycle that allows a user's helmet to serve as a brake light indicator in combination with a transmitter mounted between an existing brake light bulb and an existing brake socket of the motor cycle.

As witnessed easily on the street, motorcycle riders are vulnerable on the street especially when stepping on a brake. This causes other vehicles following behind to become confused as to its actual speed. Compared to most other vehicles showing rear brake lights on each side when viewed from behind, a motorcycle has a single brake light in a position that may correspond to a rear central portion of, for example, a passenger car, thereby prone to rear-end collisions.

A demand is to improve visibility of motorcycle brake lights and thereby decrease accident probabilities. Another demand is to substantially utilize existing braking system of a motorcycle so that another safety mechanism can be secured for more motorcycle riders in a relatively low price.

SUMMARY OF THE INVENTION

The present invention is contrived to overcome the conventional disadvantages. Accordingly, it is an object of the invention to provide a brake light control system for a motorcycle that enables a user's helmet to serve as a brake light indicator. Another object is to substantially utilize an existing brake system to activate the brake light indicator mounted on the helmet, thereby increasing usability. A further object is to take advantage of solar energy to activate the brake light indicator.

To achieve the above-described objects, the brake light control system for a motorcycle according to the present invention comprises a module attached to a helmet. The module includes a signal receiver, a light emitter, and a battery to power the signal receiver and the light emitter. The signal receiver is to selectively activate the light emitter. A brake light assembly is attached to the motorcycle and includes a brake socket connected to a power source in the motorcycle. A bulb plug of a brake light bulb is to be removably plugged in the brake socket to allow the brake bulb to become lightened in accordance with a braking operation of a user of the motorcycle; and a transmitter having a socket and a plug. The transmitter is removably installed between the bulb plug and the brake socket in a way in which the bulb plug is mounted in the transmitter socket, and the transmitter plug is mounted in the brake socket. The transmitter radiates a brake signal to the signal receiver of the module while electrically activating the brake light bulb, in accordance with the braking operation of the motorcycle, whereby the braking operation of the motorcycle enables the brake light bulb and the light emitter to become simultaneously lightened. A solar cell may be attached to the module to charge the battery.

In an embodiment, a light control system for a motorcycle comprises a module attached to a helmet. The module includes a signal receiver, a brake light emitter, turn light emitters, and a battery to power the signal receiver and the light emitters. A light assembly includes first to third sockets each connected to a power source in the motorcycle. Each bulb plug of first to third light bulbs is to be removably plugged in said each socket in sequence to allow said each light bulb to become selectively lightened in accordance with a corresponding command of a user of the motorcycle; and first to third transmitters each having a socket and a plug, and each removably installed sequentially between the first light bulb plug and the first socket of the light assembly, between the second light bulb plug and the second socket of the light assembly, and between the third light bulb plug and the third socket of the light assembly, in a way in which said each plug of the transmitters is correspondingly mounted in said each socket of the light assembly, and said each plug of the light bulbs is correspondingly mounted in said each socket of the transmitters. The first transmitter radiates a brake signal to the signal receiver to activate the brake light emitter, and the second and third transmitters selectively radiate turn signals to the signal receiver to activate the turn light emitters while electrically activating the light bulbs, in accordance with the motorcycle user's command, whereby the lighting operation of the motorcycle enables the selected light emitters and the selected light bulbs to become simultaneously lightened when commanded by the motorcycle user.

Preferably, the signal receiver may be embedded in the helmet. The module is detachably attached to a rear portion of the helmet. The brake light emitter is a light emitting diode. The brake light emitter is either a single or a plurality of light emitting diodes. The brake light emitter is aligned between the turn light emitters in a linear format.

The advantages of the present invention are numerous in that: (1) the brake light system for a motorcycle according to the present invention employs an adaptor mechanism where a transmitter serving as an adaptor is provided between an existing socket and an existing bulb plug to radiate a brake signal to a signal receiver attached to a helmet, thereby enabling a motorcycle user to easily upgrade the motorcycle for further safety and accident prevention; (2) since the transmitter is produced to fit between the existing light bulb plug and the socket in the motorcycle, its applicability easily reaches different motorcycles, thereby improving product usability and cost effectiveness; and (3) a solar cell and a rechargeable battery to become charged by the solar cell can be easily adapted to the signal receiver, thereby improving product satisfaction.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE PREFERRED EMBODIMENTS

Figure 1:
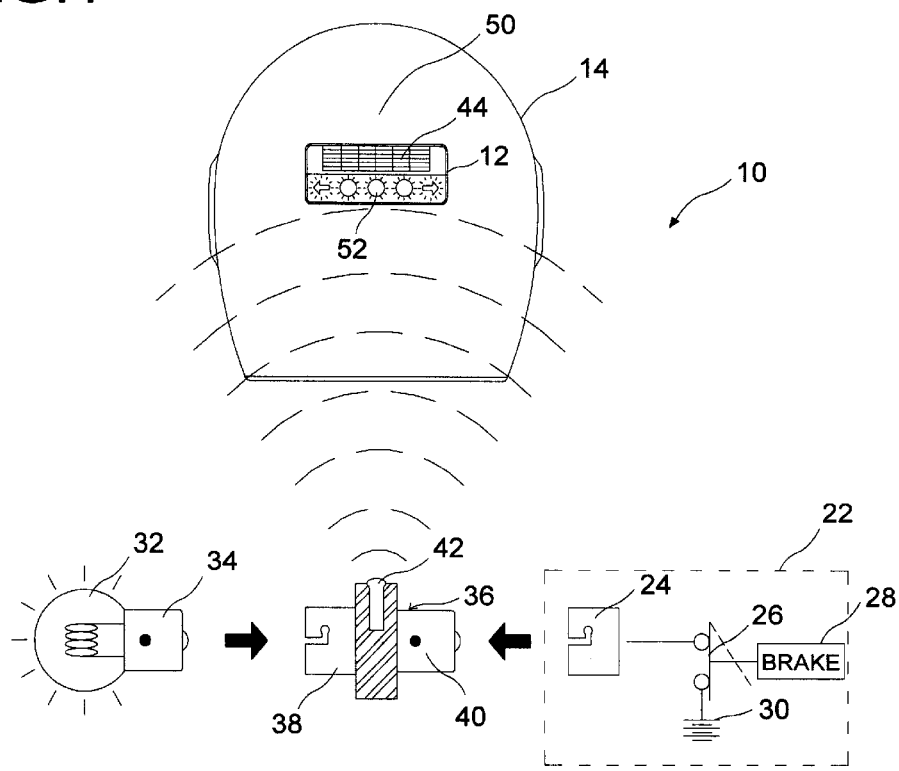
FIG. 1 is a view showing a mechanism of the brake light control system for a motorcycle according to a preferred embodiment of the present invention.
Figure 2:
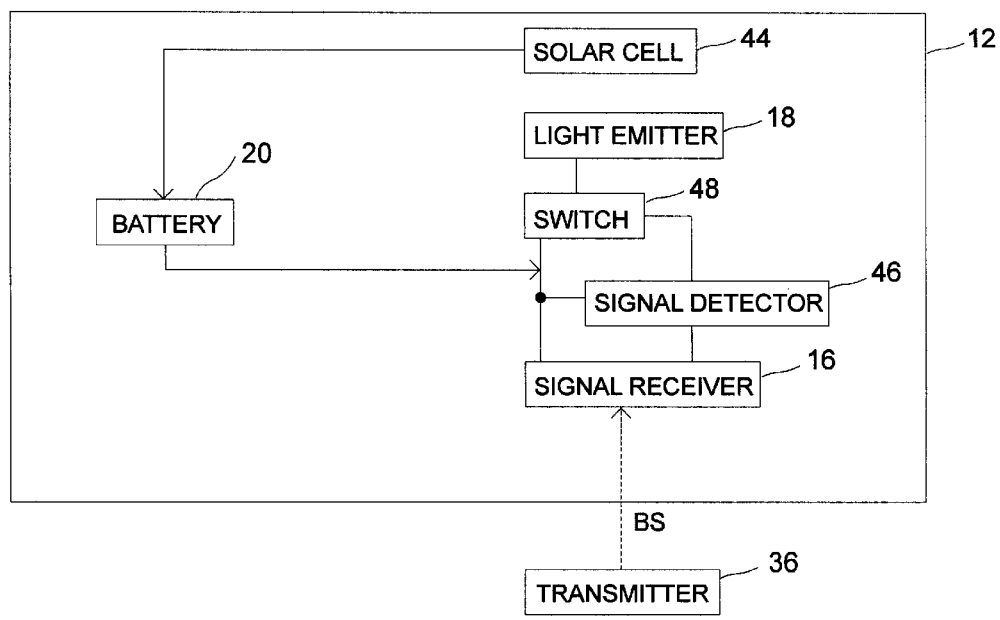
FIG. 2 is a block diagram detailing a module in FIG. 1.

As shown in FIGS. 1 and 2, a brake light control system 10 for a motorcycle (not shown) comprises a module 12 attached to a helmet 14. The module 12 includes a signal receiver 16, a light emitter 18, and a battery 20. The battery 20 is provided to power the signal receiver 16 and the light emitter 18. The signal receiver 16 is provided to selectively activate the light emitter 18 when required by a user (not shown) of the motorcycle (not shown).

A brake light assembly 22 is provided to function with the module 12 and attached to the motorcycle (not shown). The brake light assembly 22 includes a brake socket 24, a brake switch 26, a brake control 28, and a power source 30 each assembled in the motorcycle (not shown). The brake socket 24 is connected to a power source 30 via the brake switch 26. The brake control 28 controls the brake switch 26 such that when the brake switch 26 is turned ON in accordance with a braking operation of the motorcycle rider (not shown) the brake socket 24 becomes connected to the power source 30, whereby the speed decrease of the motorcycle can be warned to other vehicle riders following behind on the street in form of light signaling. When the brake control 28 is released to accelerate from the deceleration mode, the brake switch 26 is turned OFF so the brake socket 24 is disconnected from the power source 30 to thus allow the light signaling to subsequently become turned off.

In a conventional system, a brake light bulb 32 having a plug 34 is to be removably plugged in the brake socket 24 to allow the brake bulb 34 to become lightened in accordance with a braking operation of a user of the motorcycle (not shown), whereas the present invention provides a transmitter 36 between the light bulb 32 and the brake light assembly 22.

Specifically, the transmitter 36 includes a socket 38 arid a plug 40. The transmitter 36 is removably installed between the bulb plug 34 of the brake light bulb 32 and the brake socket 24 of the brake light assembly 22 in a way in which the bulb plug 34 is mounted in the transmitter socket 38, and the transmitter plug 40 is mounted in the brake socket 24. In this construction, the transmitter 36 radiates an infrared brake signal BS in a wireless mode to the signal receiver 16 of the module 12 while electrically activating the brake light bulb 32, in accordance with the braking operation of the motorcycle (not shown), whereby the braking operation of the motorcycle (not shown) enables the brake light bulb 32 and the light emitter 18 of the module 12 to become simultaneously lightened. The transmitter 36 further includes a transducer 42 that serves to convert the electric current from the power source 30 to the infrared brake signal BS.

In a preferred version, the module 12 further includes a solar cell 44 attached to the module 12 to charge the battery 20. A signal detector 46 and an automatic switch 48 may be provided in the module 12 to effectively function for the light emitter 18. The light emitter 18 is connected via the auto switch 48 to the battery 20, and the signal detector 46 controls the auto switch 48 such that the light emitter 18 becomes turned ON when the signal detector 46 detects that the signal receiver 16 has received the brake signal BS from the transducer 42 of the transmitter 36. The signal detector 46 and the signal receiver 16 are each powered by the battery 20. When the brake signal BS does not reach the signal receiver 16, the signal detector 46 commands the auto switch 48 to turn OFF so that the light emitter 18 becomes subsequently disconnected from the battery 20.

For a better performance, the signal receiver 16 may be embedded in the helmet 14. It is also preferred that the module 12 is detachably attached to a rear portion 50 of the helmet 12. The light emitter 18 may be formed of either a single or a plurality of light emitting diodes 52. The battery 20 in the module 12 may be either replaceable or electrically rechargeable.

Figure 3:
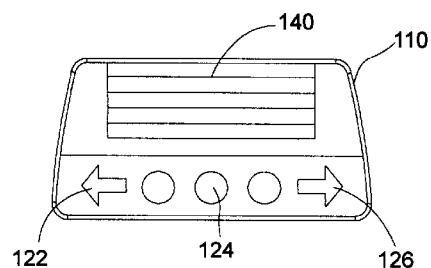
FIG. 3 is a view showing another module attached on a helmet according to the present invention.
Figure 4:
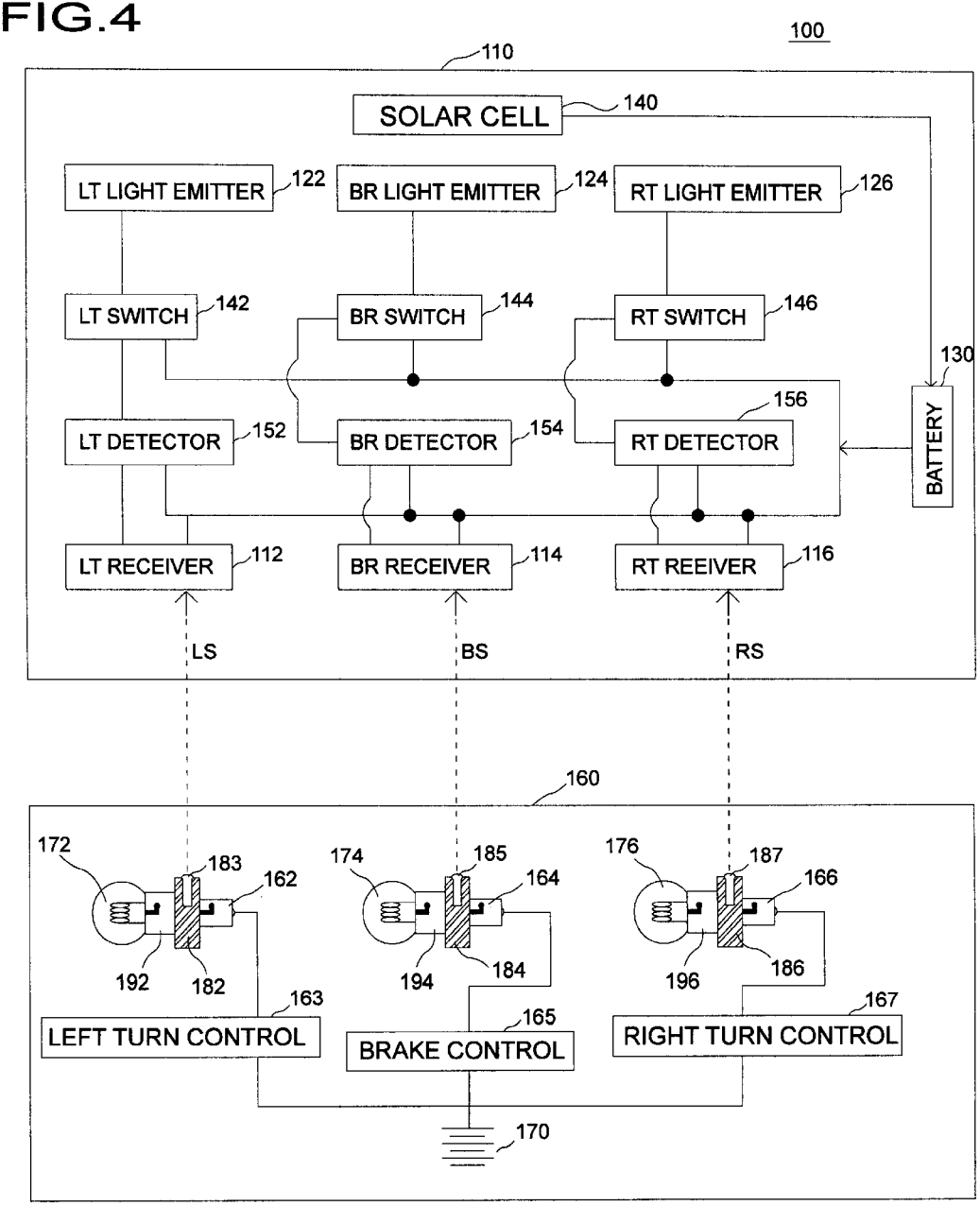
FIG. 4 is a structural view showing a mechanism of the brake light control system for a motorcycle according to another embodiment of the present invention.

FIGS. 3 and 4 demonstrate an embodiment of the present invention. As shown therein, a light control system 100 for a motorcycle (not shown) comprises a module 110 attached to the helmet 14. The module 110 includes a left turn signal receiver 112, a brake signal receiver 114, and a right turn signal receiver 116 to selectively activate a left turn light emitter 122, a brake light emitter 124, and a right turn light emitter 126 each to become powered by a battery 130 which also powers each signal receiver 112, 114, 116. Switches 142, 144, 146 are provided in the module 110 to control activation of each light emitter 122, 124, 126. Signal detectors 152, 154, 156 are selectively provided in the module 110 to control each signal receiver 112, 114, 116, and each switch 142, 144, 146. A solar cell 140 is attached to the module 110 to charge the battery 130 which serves to power each receiver 112, 114, 116, each light emitter 122, 124, 126 and each detector 152, 154, 156.

A light assembly 160 is attached to the motorcycle (not shown). The light assembly 160 includes first to third sockets 162, 164, 166 each connected to a power source 170 in the motorcycle (not shown) sequentially via left turn control 163, brake control 165 and right turn control 167. In a conventional mode, each bulb plug of first to third light bulbs 172, 174, 176 is to be removably plugged in each socket 162, 164, 166 in sequence to allow each light bulb 172, 174, 176 to become selectively lightened in accordance with a corresponding command of a user of the motorcycle (not shown), whereas the present invention provides transmitters 182, 184, 186 between the bulbs 172, 174, 176 and the sockets 162, 164, 166.

The first to third transmitters 182, 184, 186 each includes a socket 192, 194, 196 and a plug, and each becomes removably installed sequentially between the plug of the first light bulb 172 and the first socket 162, between the plug of the second light bulb 174 and the second socket 164, and between the plug of the third light bulb 176 and the third socket 166 of the light assembly 160, in a way in which each plug of the transmitters 182, 184, 186 is correspondingly mounted in each socket 162, 164, 166 of the light assembly 160, and each plug of the light bulbs 172, 174, 176 is correspondingly mounted in said each socket 192, 194, 196 of the transmitters 182, 184, 186. The transmitter 182, 184, 186 each include transducer 183, 185, 187 to convert the electric current from the power source 170 to an infrared left turn signal LS, an infrared brake signal BS, and an infrared right turn signal RS.

In accordance with activation of the left turn control 163 by the motorcycle rider (not shown), the first transmitter 182 allows the transducer 183 to radiate the left turn signal LS to the first signal receiver 112 to subsequently activate the left turn light emitter 122 while electrically activating the left turn light bulb 172. According to activation of the brake control 165 by the motorcycle rider (not shown), the second transmitter 184 allows the transducer 185 to radiate the brake signal BS to the second signal receiver 114 to subsequently activate the brake light emitter 124 while electrically activating the brake light bulb 174. And the third transmitter 186 according to activation of the right turn control 167 by the motorcycle rider (not shown) allows the transducer 187 to radiate the right turn signal RS to the third signal receiver 116 to subsequently activate the right turn light emitter 126 while electrically activating the right turn light bulb 176. Consequently, the selective lighting operation of the motorcycle (not shown) enables the light emitters 122, 124, 126 and the light bulbs 172, 174, 176 to become simultaneously lightened when commanded by the motorcycle user. Here, the user's command may be selectively implemented in accordance with a manual operation of the motorcycle. It is also recommended that the brake light emitter 124 be aligned between the turn light emitters 122, 126 in a linear format.

An advantage of the present invention is that the brake light system for a motorcycle employs an adaptor mechanism where a transmitter serving as an adaptor is provided between an existing socket and an existing bulb plug to radiate an infrared brake signal to a signal receiver attached to a helmet, thereby enabling a motorcycle user to easily upgrade the motorcycle for further safety and accident prevention.

Further, since the transmitter is produced to fit between the existing light bulb plug and the socket in the motorcycle, its applicability easily reaches different motorcycles, thereby improving product usability and cost effectiveness. In addition, a solar cell and a rechargeable battery to become charged by the solar cell can be easily adapted to the signal receiver, thereby improving product satisfaction.

Although the invention has been described in considerable detail, other versions are possible by converting the aforementioned construction. Therefore, the scope of the invention shall not be limited by the specification specified above and the appended claims.

What is claimed is:

1. A brake light control system for a motorcycle having a brake light assembly, comprising:
    a) a module attached to a helmet, wherein the module includes a signal receiver, a light emitter, and a battery to power the signal receiver and the light emitter, wherein the signal receiver is to selectively activate the light emitter; and
    b) a transmitter having a socket and a plug, wherein the transmitter is removably installed between a bulb plug of a brake light bulb and a brake socket provided in the brake light assembly in a way in which the bulb plug is mounted in the transmitter socket, and the transmitter plug is mounted in the brake socket connected to a power source in the motorcycle, wherein the transmitter radiates a brake signal to the signal receiver of the module while electrically activating the brake light bulb, in accordance with a braking operation of a user of the motorcycle, whereby the braking operation of the motorcycle enables the brake light bulb and the light emitter to become simultaneously lightened.

2. The light control system of claim 1 wherein the signal receiver is embedded in the helmet.

3. The light control system of claim 1 wherein the module is detachably attached to a rear portion of the helmet.

4. The light control system of claim 1 wherein the light emitter is a light emitting diode.

5. The light control system of claim 1 wherein the light emitter is a plurality of light emitting diodes.

6. A brake light control system for a motorcycle having a brake light assembly, comprising:
    a) a module attached to a helmet, wherein the module includes a signal receiver, a light emitter, and a battery to power the signal receiver and the light emitter, wherein the signal receiver is to selectively activate the light emitter;
    b) a solar cell attached to the module to charge the battery; and
    c) a transmitter having a socket and a plug, wherein the transmitter is removably installed between a bulb plug of a brake light bulb and a brake socket provided in the brake light assembly in a way in which the bulb plug is mounted in the transmitter socket, and the transmitter plug is mounted in the brake socket connected to a power source in the motorcycle, wherein the transmitter radiates a brake signal to the signal receiver of the module while electrically activating the brake light bulb, in accordance with a braking operation of a user of the motorcycle, whereby the braking operation of the motorcycle enables the brake light bulb and the light emitter to become simultaneously lightened.

7. The light control system of claim 6 wherein the signal receiver is embedded in the helmet.

8. The light control system of claim 6 wherein the module is detachably attached to a rear portion of the helmet.

9. The light control system of claim 6 wherein the light emitter is a light emitting diode.

10. The light control system of claim 6 wherein the light emitter is a plurality of light emitting diodes.

11. The light control system of claim 6 wherein the battery is electrically rechargeable.

12. A light control system for a motorcycle having a brake light assembly, comprising:
    a) a module attached to a helmet, wherein the module includes a signal receiver, a brake light emitter, turn light emitters, and a battery to power the signal receiver and the light emitters, wherein the signal receiver is to selectively activate said each light emitter;
    b) a solar cell attached to the module to charge the battery; and
    c) first to third transmitters each having a socket and a plug, and each removably installed sequentially between a plug of a first light bulb and a first socket provided in the light assembly, between a plug of a second light bulb and a second socket provided in the light assembly, and between a plug of a third light bulb and a third socket provided in the light assembly, in a way in which said each plug of the transmitters is correspondingly mounted in said each socket of the light assembly, and said each plug of the light bulbs is correspondingly mounted in said each socket of the transmitters, wherein the first transmitter radiates a brake signal to the signal receiver to activate the brake light emitter, and the second and third transmitters selectively radiate turn signals to the signal receiver to activate the turn light emitters while electrically activating the light bulbs, in accordance with the motorcycle user's command, whereby the lighting operation of the motorcycle enables the selected light emitters and the selected light bulbs to become simultaneously lightened when commanded by the motorcycle user.

13. The light control system of claim 12 wherein the signal receiver is embedded in the helmet.

14. The light control system of claim 12 wherein the module is detachably attached to a rear portion of the helmet.

15. The light control system of claim 12 wherein the brake light emitter is a light emitting diode.

16. The light control system of claim 12 wherein the brake light emitter is a plurality of light emitting diodes.

17. The light control system of claim 12 wherein the user's command is selectively implemented in accordance with a manual operation of the motorcycle.

18. The light control system of claim 12 wherein the brake light emitter is aligned between the turn light emitters in a linear format.

* * * * *